United States Patent
Hande et al.

(10) Patent No.: US 12,232,066 B2
(45) Date of Patent: *Feb. 18, 2025

(54) WIRELESS COMMUNICATION INCLUDING XR TRAFFIC AWARENESS

(71) Applicant: QUALCOMM Incorporated, San Diego, CA (US)

(72) Inventors: Prashanth Haridas Hande, San Diego, CA (US); Jay Kumar Sundararajan, San Diego, CA (US); Yeliz Tokgoz, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,355

(22) Filed: Mar. 14, 2023

(65) Prior Publication Data

US 2023/0292270 A1 Sep. 14, 2023

Related U.S. Application Data

(63) Continuation of application No. 16/903,312, filed on Jun. 16, 2020, now Pat. No. 11,632,732.
(Continued)

(51) Int. Cl.
*H04W 72/00* (2023.01)
*H04W 52/02* (2009.01)
(Continued)

(52) U.S. Cl.
CPC ..... *H04W 56/004* (2013.01); *H04W 52/0216* (2013.01); *H04W 72/53* (2023.01)

(58) Field of Classification Search
CPC ........... H04W 56/004; H04W 72/0493; H04W 52/0216; H04W 72/1278; H04W 76/28;
(Continued)

(56) References Cited

U.S. PATENT DOCUMENTS 10,182,368 B1 * 1/2019 Govindassamy ..... H04W 56/00
2012/0281536 A1 11/2012 Gell et al.
(Continued)

FOREIGN PATENT DOCUMENTS

CN 101971554 A 2/2011
EP 2146523 A1 1/2010
(Continued)

OTHER PUBLICATIONS

International Preliminary Report on Patentability—PCT/US2020/039157, The International Bureau of WIPO—Geneva, Switzerland, Jan. 6, 2022.
(Continued)

*Primary Examiner* — Lakeram Jangbahadur
(74) *Attorney, Agent, or Firm* — Procopio, Cory, Hargreaves & Savitch LLP

(57) ABSTRACT

A configuration to allow a base station to be synchronized with an application server to enable the base station to align uplink transmissions of a UE with downlink reception periods of the UE. The base station communicates with a UE using periodic uplink traffic bursts and periodic downlink traffic bursts. The base station selects a time offset to at least one of uplink traffic or downlink traffic to increase an overlap between the uplink traffic bursts and the downlink traffic bursts. The base station sends the time offset to an AF.

25 Claims, 17 Drawing Sheets

Related U.S. Application Data

(60) Provisional application No. 62/865,849, filed on Jun. 24, 2019.

(51) Int. Cl.
*H04W 56/00* (2009.01)
*H04W 72/53* (2023.01)

(58) Field of Classification Search
CPC ......... H04W 56/0055; H04W 52/0219; H04W 72/0413; H04W 72/042; Y02D 30/70
See application file for complete search history.

(56) References Cited

U.S. PATENT DOCUMENTS

| | | |
|---|---|---|
| 2012/0281566 A1 | 11/2012 | Pelletier et al. |
| 2014/0010131 A1* | 1/2014 | Gaal .................. H04L 5/001 370/311 |
| 2014/0064160 A1 | 3/2014 | Verger et al. |
| 2014/0141779 A1* | 5/2014 | Yuk .................. H04W 28/0815 455/434 |
| 2014/0198699 A1* | 7/2014 | Makharia ............. H04W 72/04 370/311 |
| 2017/0208619 A1* | 7/2017 | Yang .................. H04W 72/21 |
| 2017/0359850 A1* | 12/2017 | Loehr .................. H04W 76/28 |
| 2017/0367058 A1 | 12/2017 | Pelletier et al. |
| 2018/0368157 A1* | 12/2018 | Jeon .................. H04W 72/044 |
| 2019/0075581 A1* | 3/2019 | Salem .................. H04W 16/14 |
| 2019/0104539 A1 | 4/2019 | Park et al. |
| 2019/0110319 A1 | 4/2019 | Tokgoz et al. |
| 2020/0314747 A1 | 10/2020 | Zhou et al. |
| 2020/0404604 A1 | 12/2020 | Hande et al. |

FOREIGN PATENT DOCUMENTS

| | | | |
|---|---|---|---|
| EP | 3138351 B1 * | 4/2018 | ........... H04W 76/28 |
| TW | 201818761 A | 5/2018 | |
| WO | WO-2014008032 | 1/2014 | |

OTHER PUBLICATIONS

International Search Report and Written Opinion—PCT/US2020/039157—ISA/EPO—Aug. 31, 2020.
Taiwan Search Report—TW109121310—TIPO—Nov. 12, 2023.

* cited by examiner

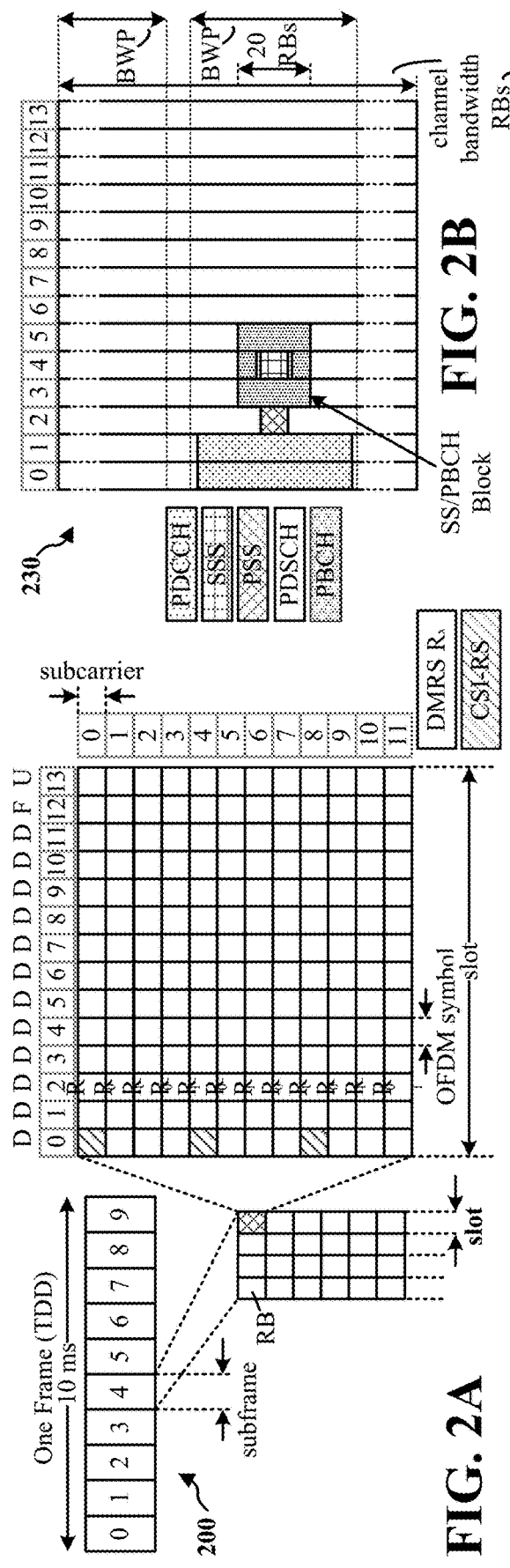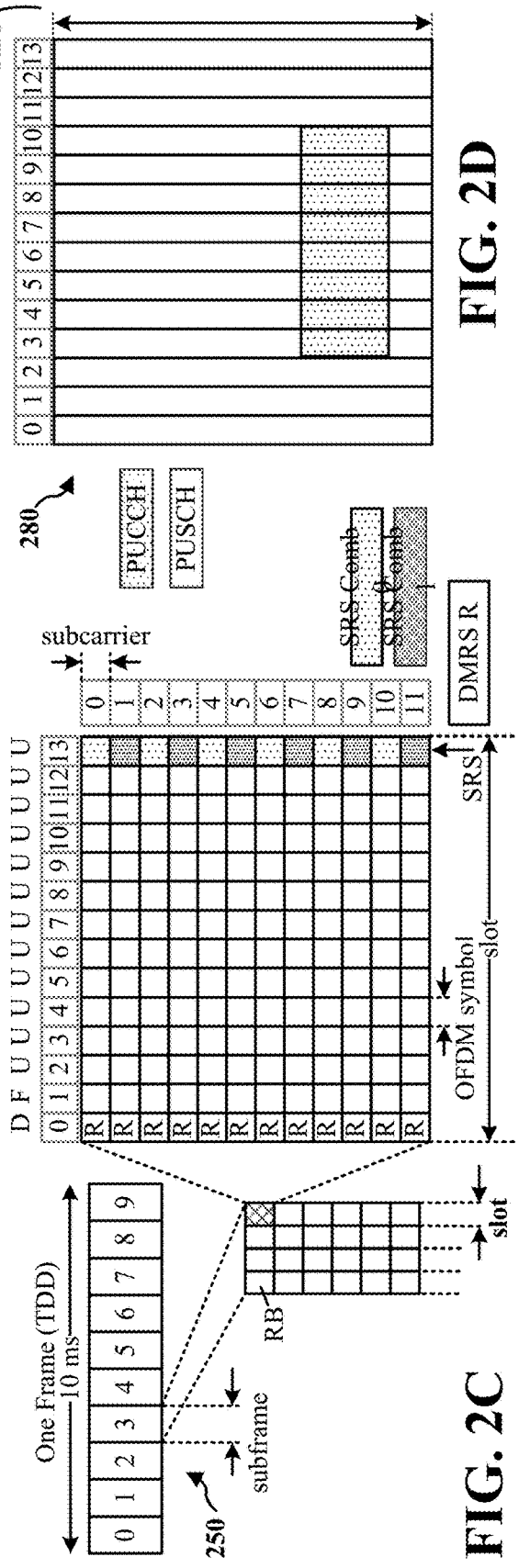
FIG. 2A  FIG. 2B  FIG. 2C  FIG. 2D

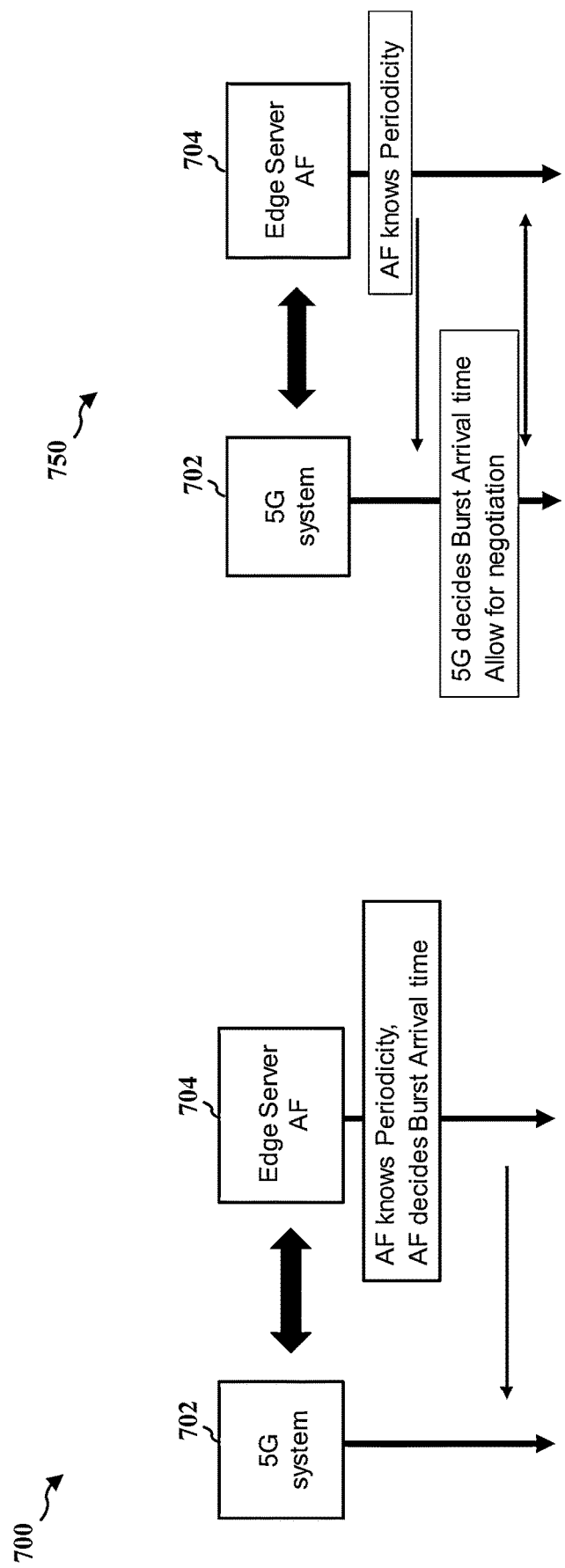

WIRELESS COMMUNICATION INCLUDING XR TRAFFIC AWARENESS

CLAIM OF PRIORITY UNDER 35. U.S.C. § 120

The present Application for Patent is a continuation of U.S. Non-Provisional application Ser. No. 16/903,312 by HANDE et al., entitled "WIRELESS COMMUNICATION INCLUDING XR TRAFFIC AWARENESS", filed Jun. 16, 2020, which claims the benefit of U.S. Provisional Application Ser. No. 62/865,849, entitled "WIRELESS COMMUNICATION INCLUDING XR TRAFFIC AWARENESS" filed on Jun. 24, 2019, assigned to the assignee hereof, and expressly incorporated by reference herein.

BACKGROUND

Technical Field

The present disclosure relates generally to communication systems, and more particularly, to wireless communication associated with extended reality (XR) traffic.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Extended reality (XR) may be used for different applications. XR may involve real and virtual combined environments and human-machine interactions generated by computer technology and wearables, for example. As an example, XR communication may be used for cloud gaming, virtual reality (VR) split rendering, and/or augmented reality (AR) split computation. XR communications may occur over a 5G NR system, in conjunction with an edge server. For example, a UE may receive XR data, which the UE may transmit to a base station, wherein the base station may provide the XR data to the core network. The core network may interface with the edge server and provide the XR data to the edge server. However, the 5G system and the edge server may be based on independent clocks, such that computation and communication might not be coordinated. The present disclosure allows for the 5G system and the edge server to be synchronized in order to improve and coordinate computation and communication.

In an aspect of the disclosure, a method, a computer-readable medium, and an apparatus are provided. The apparatus may be a device at a base station. The device may be a processor and/or a modem at a base station or the base station itself. The apparatus communicates with a user equipment (UE) using periodic uplink traffic bursts and periodic downlink traffic bursts. The apparatus selects a time offset to at least one of uplink traffic or downlink traffic to increase an overlap between the uplink traffic bursts and the downlink traffic bursts. The apparatus send the time offset to an application function (AF).

In an aspect of the disclosure, a method, a computer-readable medium, and an apparatus are provided. The apparatus may be a device at a UE. The device may be a processor and/or a modem at a UE or the UE itself. The apparatus communicates with a base station using periodic uplink traffic bursts and periodic downlink traffic bursts. The apparatus configuring a discontinuous reception (DRX) cycle based on the periodic uplink and downlink traffic bursts, wherein uplink transmission are grant based. The apparatus delays sending a scheduling request (SR) for uplink traffic to a beginning of a next DRX cycle.

In an aspect of the disclosure, a method, a computer-readable medium, and an apparatus are provided. The apparatus may be a device at a UE. The device may be a processor and/or a modem at a UE or the UE itself. The apparatus communicates with a base station using periodic uplink traffic bursts and periodic downlink traffic bursts. The apparatus receives a configuration of a DRX cycle based on the periodic uplink and downlink traffic bursts, wherein uplink transmission are grant based. The apparatus transmits a scheduling request (SR) prior to an arrival of the uplink traffic when the arrival of uplink traffic burst is expected to arrive within the next DRX cycle.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIGS. 7A-7B illustrate diagrams of an edge server and a 5G system in accordance with certain aspects of the disclosure.

DETAILED DESCRIPTION

Figure 1:
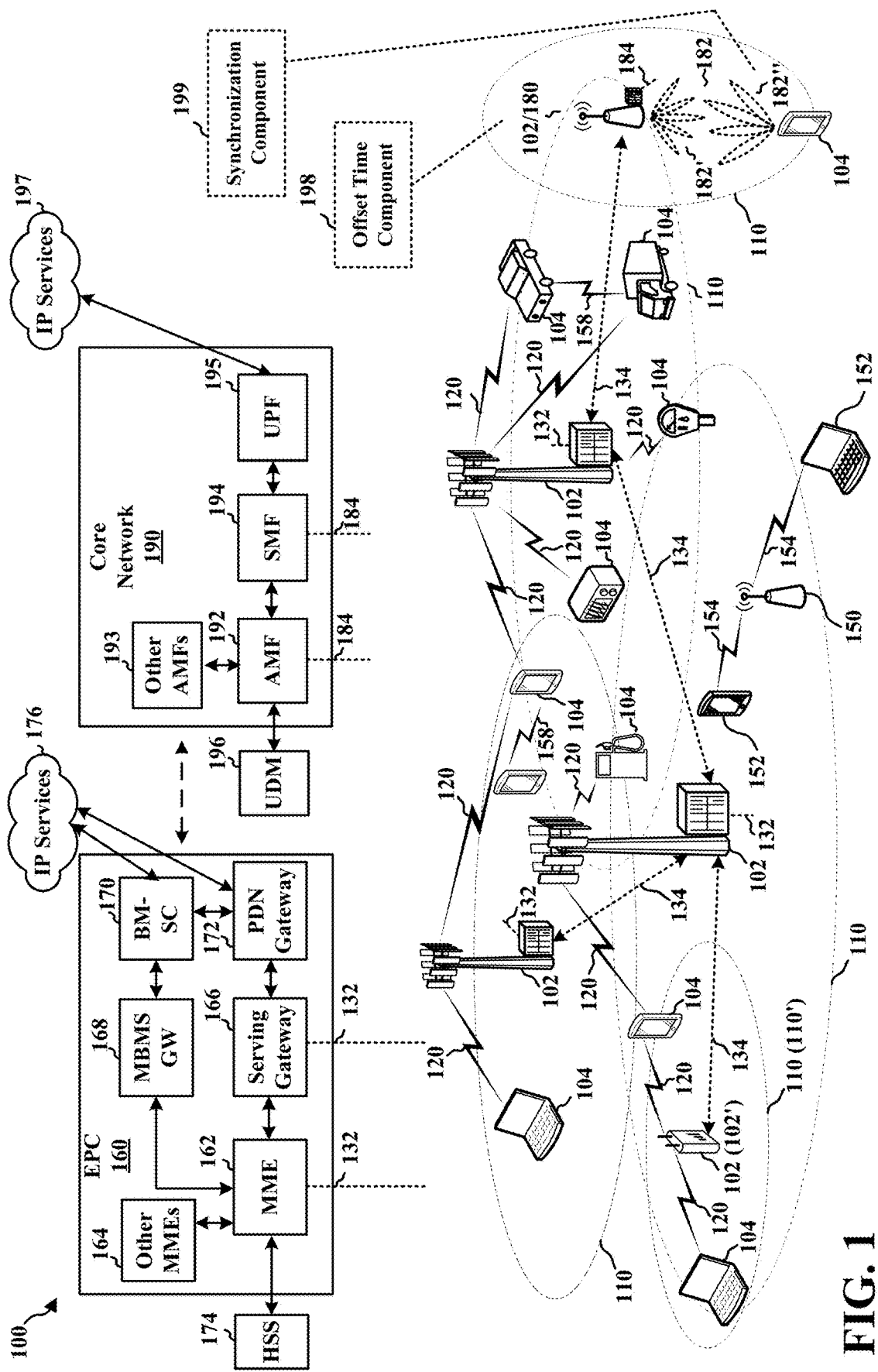
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to align the uplink transmissions and downlink receptions for UEs. For example, the base station 180 of FIG. 1 may include an offset time component 198 configured to select an offset time for transmitting a periodic downlink traffic burst to a UE based on a processing timeline associated with an application server. The base station 180 may communicate with a UE using periodic uplink traffic bursts and periodic downlink traffic bursts. The base station 180 may select a time offset to at least one of uplink traffic or downlink traffic to increase an overlap between the uplink traffic bursts and the downlink traffic bursts. The base station 180 may send the time offset to an application function (AF).

Referring again to FIG. 1, in certain aspects, the UE 104 may be configured to adjust it uplink transmissions in order to be synchronized with a processing timeline associated with an application server. For example, the UE 104 of FIG. 1 may include a synchronization component 199 configured to adjust periodic uplink traffic bursts from the UE based on an offset, such that the UE is synchronized with the processing timeline.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
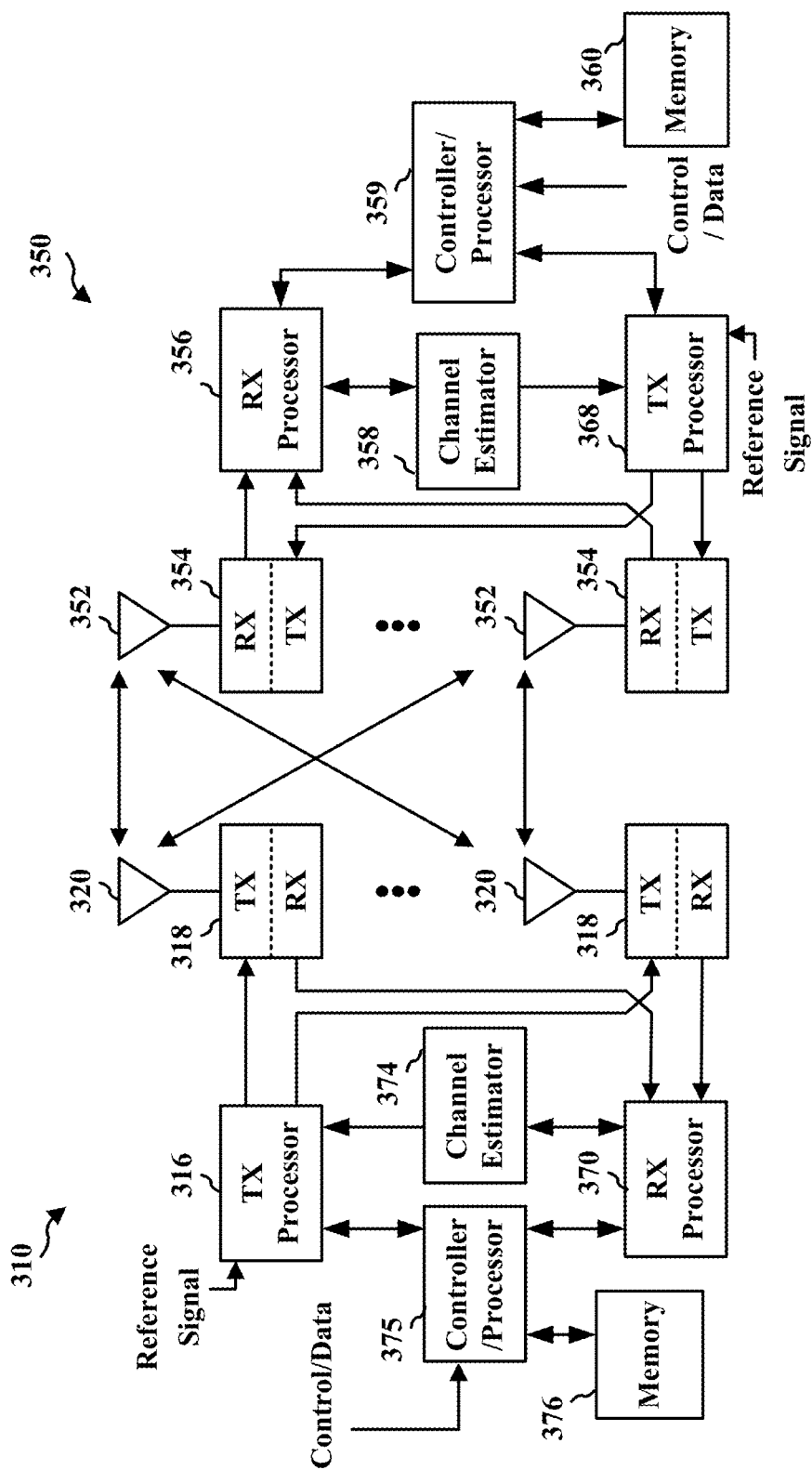
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Table 1 illustrates examples of QoS parameters for different types of communications. The table indicates a 5G QoS indicator (5QI) value for a corresponding packet delay budget (PDB), packet error rate (PER), default maximum data burst (MDB) volume, and example services for the 5QI value. The examples shown for 5QI values 1, 2, 6, 8, and 9 may correspond to eMBB uses cases. The examples for eMBB may correspond to various different types of traffic. The example shown for 5QI value 80 may correspond to an XR use case, and the example shown for 5QI value 81 may correspond to an URLLC use case. URLLC may have a very low latency, e.g., a PDB≤5 ms, and a high reliability, e.g., a PER≤$10^{-5}$, for low data rate traffic. XR communication may have a high reliability, e.g., a PER≤$10^{-3}$, and a low latency, e.g., a PDB in the range of 5 ms≤PDB≤25 ms. However, in contrast to URLLC, XR may have a high bit rate.

TABLE 1

| 5QI Value | Packet Delay Budget | Packet Error Rate | Default Maximum Data Burst Volume | Example Services |
|---|---|---|---|---|
| 1 | 100 ms | $10^{-2}$ | N/A | Conversational Voice |
| 2 | 150 ms | $10^{-3}$ | N/A | Conversational Video (Live Streaming) |
| 6, 8, 9 | 300 ms | $10^{-6}$ | N/A | Video (Buffered Streaming) TCP-based (e.g., www, e-mail, chat, ftp, p2p file sharing, progressive video, etc.) |
| ... | ... | ... | ... | ... |
| 80 | 10 ms | $10^{-6}$ | N/A | Low Latency eMBB applications Augmented Reality |
| 81 | 5 ms | $10^{-5}$ | 160 B | Remote control |
| ... | ... | ... | ... | ... |

XR may be used for different applications. XR may involve real and virtual combined environments and human-machine interactions generated by computer technology and wearables, for example. As an example, XR communication may be used for cloud gaming, virtual reality (VR) split rendering, and/or augmented reality (AR) split computation. Table 2 illustrates a chart showing example uses for XR.

TABLE 2

| | Cloud Gaming | VR split rendering | AR split computation |
|---|---|---|---|
| HMD/Device | 5G Smartphone or Tablet | Head-mounted with 5G modem attached | Head-mounted with USB/Bluetooth connection to "Puck" or Smartphone with 5G modem. Low power (2W) AR glass |
| 5G usage Location | QOS/OTT Outdoor | QOS Enterprise-Indoor, Residential-Indoor, Outdoor | QOS Enterprise-Indoor, Outdoor |
| Mobility | Static, Hi-speed | Limited to head movements and restricted body movements, Hi-speed (VR in a train, back of a car) | Pedestrian, Hi-speed |

Figure 4:
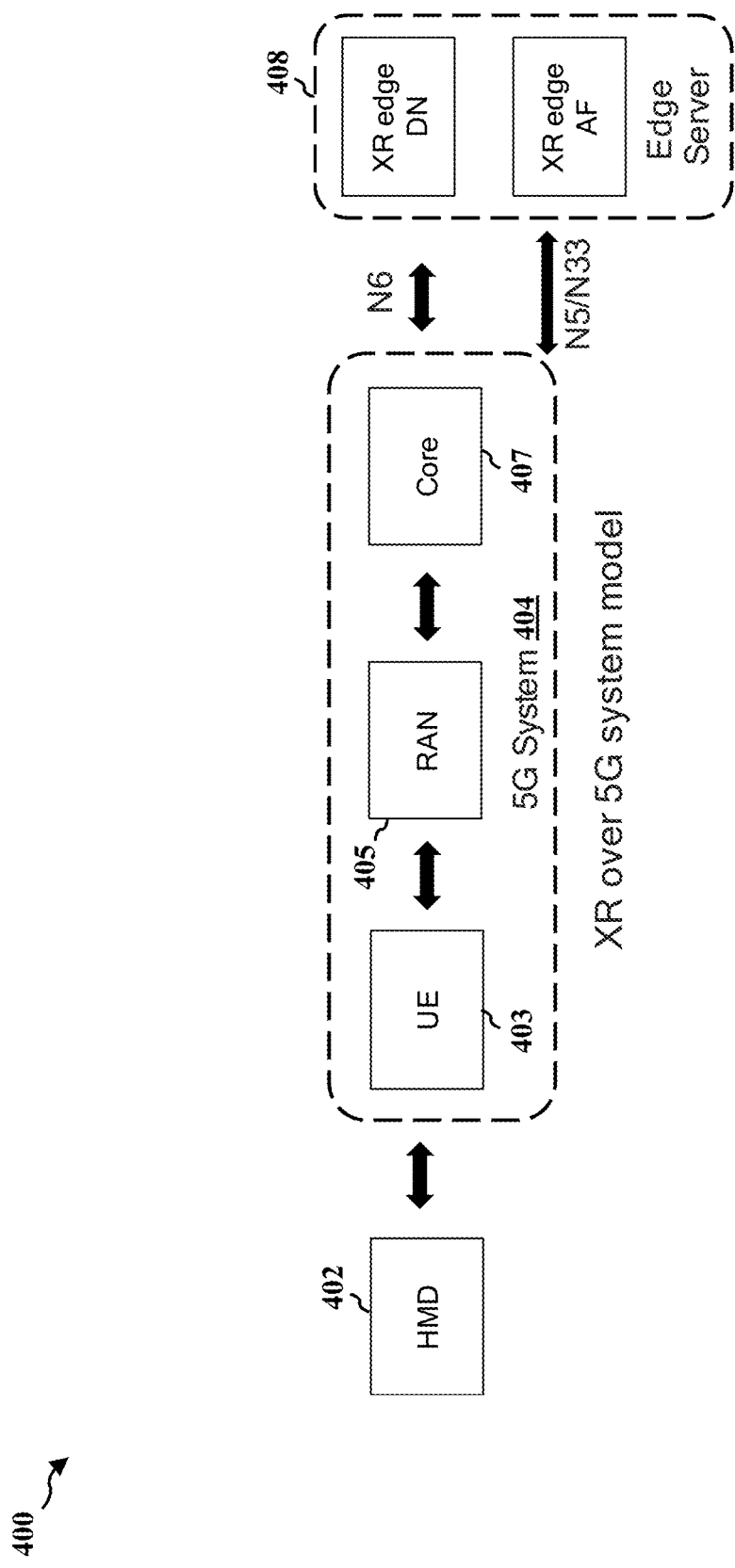
FIG. 4 is a diagram illustrating XR over a 5G system.

FIG. 4 illustrates an example system model 400 for XR communication over a 5G NR system. FIG. 4 illustrates a head mounted display (HMD) 402 that may be worn by a user. The HMD may send and receive XR communication with edge server 408 via a 5G communication system 404, e.g., as described in detail in connection with FIG. 1. The 5G system may also be referred to as an NR system. FIG. 4 illustrates the 5G system as comprising a UE 403 that transmits/receives communication with RAN 405 that transmits/receives communication with a network component 407. The UE may correspond to UE 104 in FIG. 1, and the core network component 407 may correspond to core network 190 in FIG. 1. The RAN component may correspond to a base station 102/180 in FIG. 1. Thus, the UE 403 may receive XR data from the HMD and transmit the XR data to a base station, which may provide the data to the core network 407. The core network 407 may interface with the edge server 408 to provide the data to the edge server. Similarly, the edge server 408 may provide data to the HMD by providing the data to the core network 407, which passes the data to a base station that transmits the data as downlink communication to UE 403. The UE 403 may provide the received downlink data to the HMD, e.g., via a wireless or wired connection with the HMD. Thus, 5G system 404 may transmit and receive traffic with edge server 408 that is illustrated as comprising an XR edge data network (DN) and an XR edge application function (AF). As illustrated, the traffic may be communicated using an N5/N33 network external interface and/or an N6 interface between a 5GC-UPF and the XR edge DN, e.g., real-time transport protocol (RTP)—user datagram protocol (UDP).

The 5G system 404, or NR system, may provide QoS for the XR communication. The XR session may be hosted at the edge server 408, which may be an operator server or a third party server. The latency between the core network component 407 and the edge server 408 may be assumed to be negligible. Communication between Hypertext transfer protocol (HTTP) to transport control protocol (TCP) may use latency in the latency budget for the XR communication.

Figure 5A:
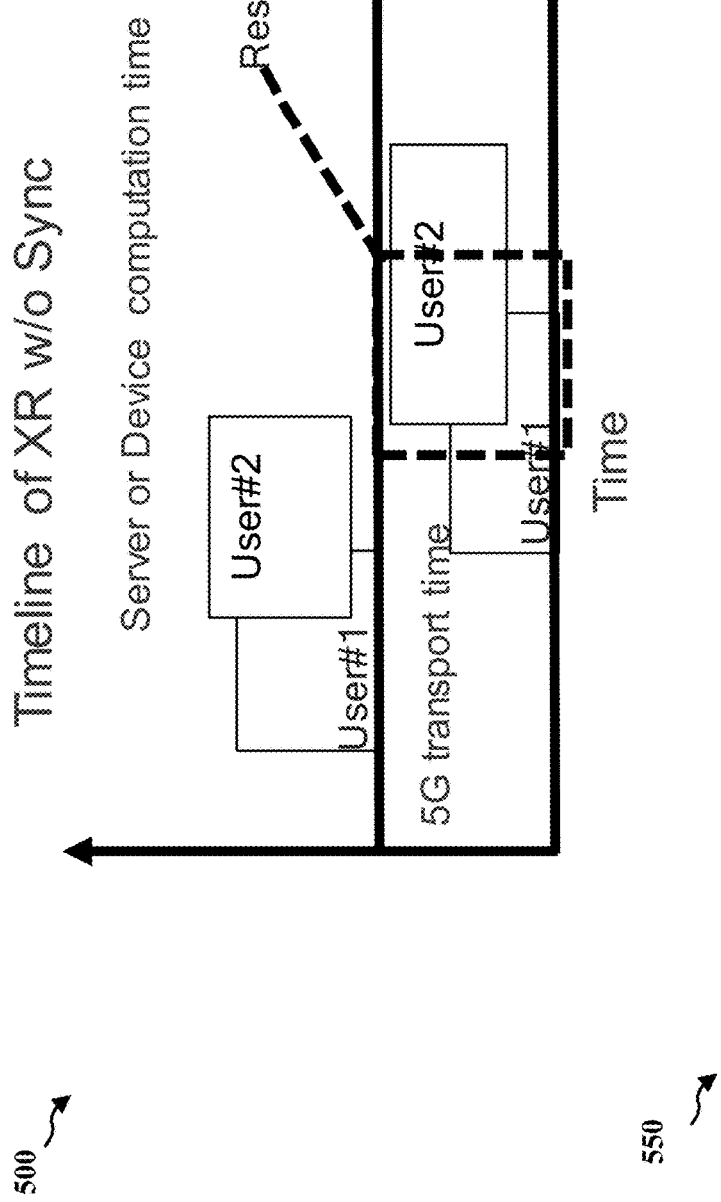
FIG. 5A is a diagram illustrating a timeline of XR without synchronization.
Figure 5B:
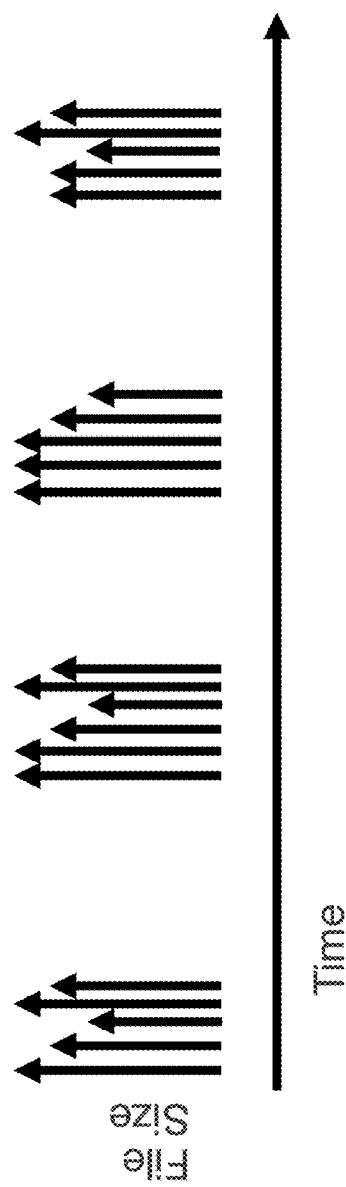
FIG. 5B is a diagram illustrating a periodic or quasi-periodic nature of XR traffic.

FIG. 5B illustrates an example graph 550 showing a periodic or quasi-periodic nature of XR traffic. The height of each line indicates a file size of the XR traffic. As illustrated, similar amounts and sizes of data may be communicated in periodic busts of traffic. XR may involve periodic rendering processes, each within a separate epoch corresponding to a length of time. The HMD may determine and send period bursts of information to the edge server, e.g., position/orientation information for the HMD. The edge server may process the position/orientation information and provide rendering information back to the HMD.

The 5G system 404, edge server 408 computation, and device computation 402 may be based on independent clocks, e.g., a clock at the HMD 402 and a clock at the edge server 408. Thus, computation and communication might not be coordinated. FIG. 5A illustrates an example timeline 500 for XR without synchronization showing resource contention between two users. Computation resources and wireless resources (e.g., 5G NR wireless resources) may be dimensioned for reliability at peak loads. At low delay budgets, higher resource contention may occur with peak loading, such as illustrated in FIG. 5A.

Figure 6:
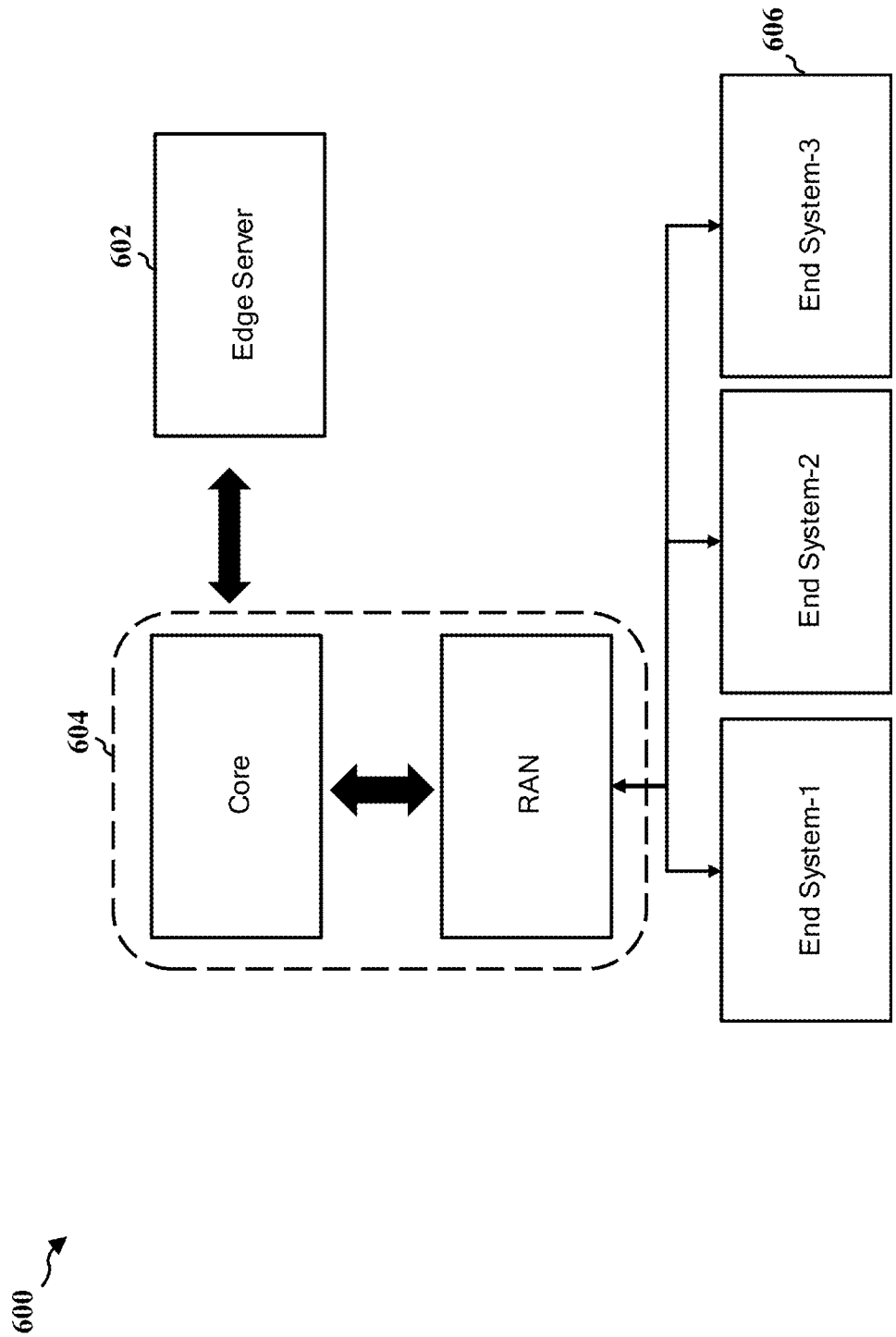
FIG. 6 is a diagram illustrating an edge server synchronized with a 5G system in accordance with certain aspects of the disclosure.

FIG. 6 provides a diagram 600 illustrating an edge server synchronized with a 5G system in accordance with certain aspects of the disclosure. The diagram 600 includes the edge server 602, the 5G network generalized by box 604 which includes the core network and the RAN, and further includes a plurality of end system devices 606. In some aspects, the edge server and device computation nodes and communication nodes may be configured to synchronize their respective clocks. The computations and communications may then be scheduled at deterministic times, due to the synchronization, which may minimize peak loading. At least one advantage of the disclosure is that synchronizing the 5G system and the edge server may optimize allocation of downlink and/or uplink resources. For example, the base station of the 5G system may schedule uplink resources for UEs to coincide with downlink receptions of the UEs. This may allow UEs to wake up from idle mode in order to transmit and receive during the same wake up duration, as opposed to waking up just to transmit, and then subsequently wake up again in order to receive, or vice versa.

FIGS. 7A-7B illustrate diagrams 700, 750 of an edge server and a 5G system in accordance with certain aspects of the disclosure. The diagram 700 includes a 5G system 702 and an edge server 704. The edge server 704 may be a server that is located close enough to the 5G network, such that latency between the edge server and the 5G network is small and negligible. Diagrams 700 and 750 disclose different aspects directed to conveying "burst arrival time" information. The "burst arrival time" may be the arrival time of the data burst at either the ingress of the RAN (e.g., downlink flow direction) or egress interface of the UE (e.g., uplink flow direction). Providing the burst arrival time assists in achieving the synchronized system. A synchronized system may occur when the clocks, for example, of the 5G system and the edge server are synchronized with respect to each other, or the respective clocks may by synchronized to a reference clock. As such, the time at which a burst of downlink traffic or uplink traffic may arrive may be specified by the 5G system back to the application or edge server, and back to the application function.

In some aspects, for example, the edge server 704 of 700 may be configured to know the periodicity of the burst of downlink traffic, such that the edge server 704 of 700 may decide the burst arrival time. Periodicity may refer to the time period between the start of two bursts. In some aspects, for example in diagram 750, the edge server 704 may be configured to know the periodicity of the burst of downlink traffic, however, the 5G system 702 of 750 may be configured to decide the burst arrival time. Thus, the 5G system 702 of 750 may determine the burst arrive time in response to a request from the edge server 704 to server periodic traffic. In some aspects, UEs that are being served by the same cell are more likely to be offset than UEs in a different cell. In addition, UEs on non-orthogonal beams may be more likely to be offset than UEs on orthogonal beams.

Figure 8A:
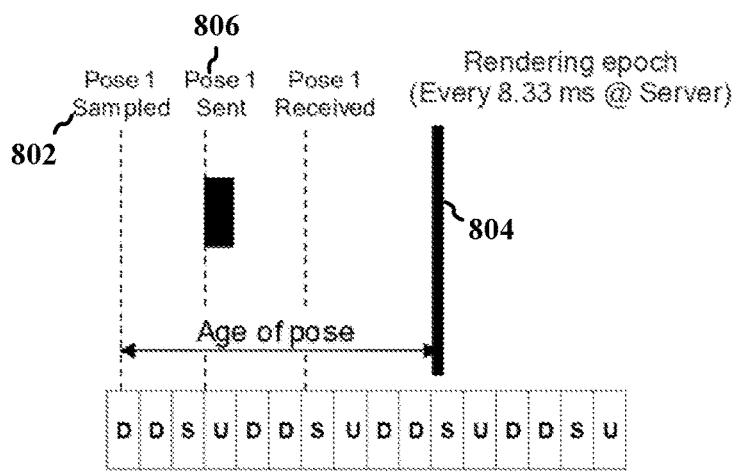
FIGS. 8A-8B illustrate diagrams of aligning uplink transmissions with downlink reception periods in accordance with certain aspects of the disclosure.
Figure 8B:
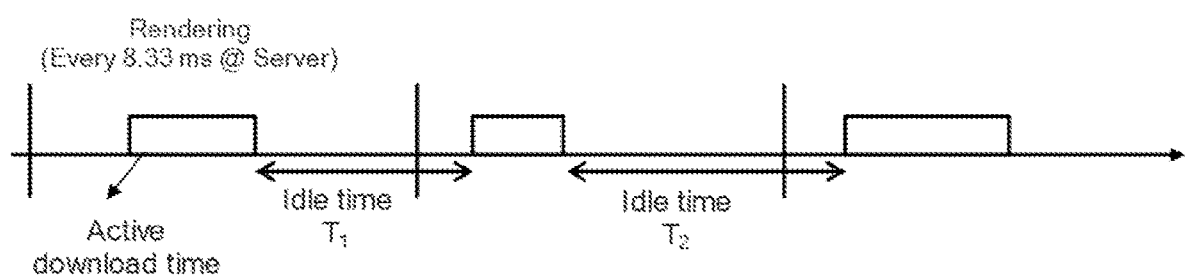

FIGS. 8A-8B illustrate diagrams 800, 850 directed to aligning uplink transmissions with downlink reception periods in accordance with certain aspects of the disclosure. Diagram 800 provides an example of the age of pose, which is the time from which a pose is first sampled (e.g., at 802) until the pose is rendered (e.g., 804). The rendering epoch 804 is the time when the downlink computation on the edge server starts, and when the pose is actually sent. For example, 802 is the first time the pose was actually sampled on the device (e.g., UE), and the time at which the pose was actually sent as an uplink transmission. The notion is that the older the pose, the more stale the pose information is going to be when the edge server starts its computation. It would be advantageous to reduce the age of the pose, in order to limit or minimize the staleness of the pose information. In some aspects, the UE may be configured to utilize the age of the pose or staleness of the pose information in order to capture pose information as close as possible to the uplink transmission time, because the UE would have an understanding of the server side data computation or rendering times.

The uplink transmission will not be sent at a random time, instead, the uplink transmission will be sent at 806, which corresponds to an uplink slot. 5G has a slot structure wherein each slot has a set of duration, such that typical slot duration of the slot structure may be 0.5 ms (based on numerology) and each of the slots may be downlink only, uplink only, or can be a combination of uplink and downlink, which is what is indicated by the letter "S" in the slot structure of FIG. 8A. In the present disclosure, uplink transmissions may occur on S slots which supports uplink transmission because it has some uplink symbols. The S slot may include uplink symbols and the U slot may only comprise uplink symbols, such that uplink transmissions may occur on S or U slots. In some aspects, the uplink transmission may occur adjacent to a D or downlink slot where there was traffic allocated to the particular UE. Some D slots may have traffic allocated to the particular UE, but some D slot may not, because D slots may be shared across multiple users. If there is an allocation of downlink traffic for a particular UE, then the uplink traffic may be transmitted in the subsequent S and U slots, adjacent the D slot, such that the amount of time that the UE has to wake up may be reduced. As such, the UE may employ an increased idle time to facilitate transmission and reception of data during the same wake up duration, as shown, for example, in diagram 850 of FIG. 8B.

Figure 9:
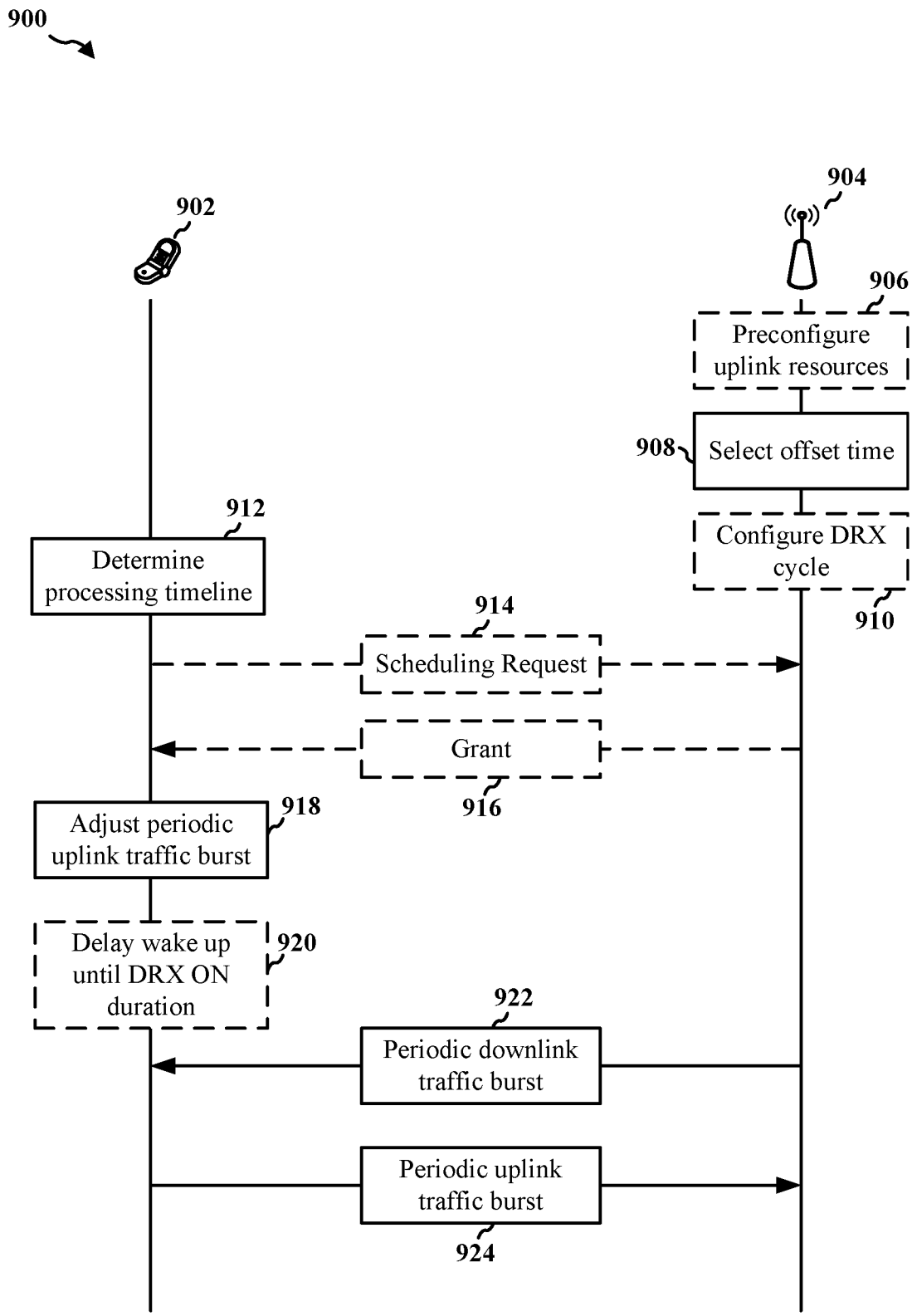
FIG. 9 is a call flow diagram of signaling between a UE and a base station in accordance with certain aspects of the disclosure.

FIG. 9 is a call flow diagram of signaling between a base station and a UE in accordance with certain aspects of the disclosure. The diagram 900 of FIG. 9 includes a UE 902 and a base station 904. The base station 904 may be configured to provide a cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350. Optional aspects are illustrated with a dashed line.

The UE 902 and base station 904 may communicate using period bursts of UL data traffic and periodic bursts of DL data traffic. The data traffic may comprise XR data traffic.

As illustrated at 908, the base station may select an offset time for at least one of the uplink data traffic or downlink data traffic. The time offset may be based on a timing difference between the downlink data traffic and the uplink data traffic. For example, the time offset for uplink traffic may be relative to the timing of the periodic bursts of uplink data traffic to increase an overlap of the uplink data traffic with the downlink data traffic. The time offset for the downlink traffic may be relative to the timing of the periodic bursts of downlink data traffic to increase an overlap of the downlink data traffic with the uplink data traffic. The base station may select the offset time to be applied to at least one of the uplink data traffic or downlink data traffic to increase an overlap between the uplink traffic bursts and the downlink traffic bursts. For example, when uplink and downlink traffic burst start times are periodic, the base station may select offsets to the uplink and downlink traffic, to be conveyed to the AF, to maximize alignment/overlap between UL and DL traffic bursts. For example, if uplink bursts occur every 4 ms, and downlink bursts occur every 8 ms, when an application starts uplink at 3 ms offset with respect to 0, and downlink starts with offset 2 ms to 0, the alignment can be maximized by sending an offset of −3 and −2 ms to the uplink and downlink respectively. The offset for the UL traffic may be communicated from the base station 904 to the UE 902.

As illustrated at 910, the base station 904 may configure a DRX cycle for the UE 902. The base station 904 may configure the DRX cycle for the UE 902 based on a periodicity of traffic arrival for the periodic uplink traffic bursts and the periodic downlink traffic bursts. The DRX cycle may be configured based on overall periodicity of uplink and downlink traffic arrival.

In some aspects, the UL or DL transmissions may be grant-free or periodic grant transmissions. For example, at 906, the base station may preconfigure resources for uplink transmissions from the UE 902.

When uplink and downlink traffic burst start times are periodic, and the RAN has allocated resources for grant-free uplink transmission, the RAN can further decide on an offset, at 908, to the downlink traffic to maximize alignment between uplink transmission resources and downlink traffic arrival. The DRX cycle may be planned based on overall periodicity of uplink transmission resources and downlink traffic arrival.

When uplink and downlink traffic burst start times are periodic, and the RAN has allocated resources for grant-free uplink transmission, the RAN can further decide on an offset, at 908, to the downlink traffic and the corresponding grant-free downlink resource allocation so as to maximize alignment between uplink transmission resources and downlink transmission resources, e.g., in which the DRX cycle is planned based on overall periodicity of uplink transmission resources and downlink transmission resources.

When uplink and downlink traffic burst start times are periodic, and the RAN has allocated resources for grant-free downlink transmission, the RAN can further decide on an offset, at 908, to the uplink traffic so as to maximize alignment between downlink transmission resources and uplink traffic arrival, e.g., in which the DRX cycle is planned based on overall periodicity of uplink traffic arrival and downlink transmission resources.

As illustrated at 912, the UE 902 may determine a processing timeline for the communication. For example, a processing timeline in XR communication may include a plurality of epochs, wherein the application server performs data processing at the conclusion of each epoch, e.g., as described in connection with FIG. 8B.

As illustrated at 914, for grant-based uplink transmissions, the UE may transmit an SR to the base station 904 and may receive a grant 916 from the base station for the uplink transmission. In some aspects, when uplink traffic burst start times are periodic, and the uplink is grant-based, and the RAN has allocated a DRX cycle, the UE can decide to delay sending the SR to the start of next DRX on time. This may apply when the DRX on time is slightly delayed compared to uplink traffic arrival time. In some aspects, when uplink traffic burst start times are periodic, and the uplink is grant-based, and the RAN has allocated a DRX cycle, the UE can send the SR at the start of next DRX on time ahead of uplink traffic arrival. This applies when the DRX on time is slightly ahead of uplink traffic arrival time. In some aspects, when uplink traffic burst start times are periodic, and the periodicity is not conveyed to the RAN, and the uplink is grant-based, and the RAN has allocated a DRX cycle, the UE can learn the periodicity of the uplink traffic and send the SR at the start of next DRX on time ahead of uplink traffic arrival.

Thus, the 5G system, e.g., 404 illustrated in FIG. 4, may receive UL and DL traffic periodicities for UL traffic from the HMD 402 and DL traffic from the edge server 408. The 5G system 404 may send an offset back to the HMD to maximize UL and DL alignment. The 5G system may also configure a DRX cycle for the UE, and therefore the HMD, based on the UL and DL traffic periodicities and the alignment based on offsets. Then, the 5G system may receive DL traffic from the edge server and UL traffic from the HMD via the UE. The DL traffic may be aligned with a DRX on portion of the DRX cycle configured for the UE. For example, the base station may hold DL traffic until the UE would be in DRX on. The hold time may be small, e.g., only accounting for jitter between the suggested offset and actual traffic arrival. The UL traffic may similarly be aligned with the DRX on state of the UE. The 5G system may UL traffic should be aligned with DRX on. The UE may hold UL traffic until the UE would be in DRX on. The hold time may be small, e.g., only accounting for jitter between the suggested offset and actual traffic arrival.

As illustrated at 918, the UE 902 may adjust an uplink traffic burst. The UE 902 may adjust the uplink traffic burst based on the offset determined by the base station at 908. The adjustment to the uplink traffic burst may help align transmission of uplink data burst(s) with the processing timeline such that uplink information, e.g., pose information, arrive just in time for rendering. The periodicity of the pose update(s) may be reduced to a periodicity of rendered traffic on the downlink. In some aspects, the uplink traffic may be adjusted to align the uplink transmission to the downlink reception time in order to prolong an idle time and the UE between the periodic traffic bursts and to save power. Thus, the UE may delay waking up, at 920, until the UE's DRX on duration.

The UE may receive downlink traffic bursts, at 922, and may transmit periodic uplink traffic bursts, at 924, based on the adjustment at 918.

Figure 10:
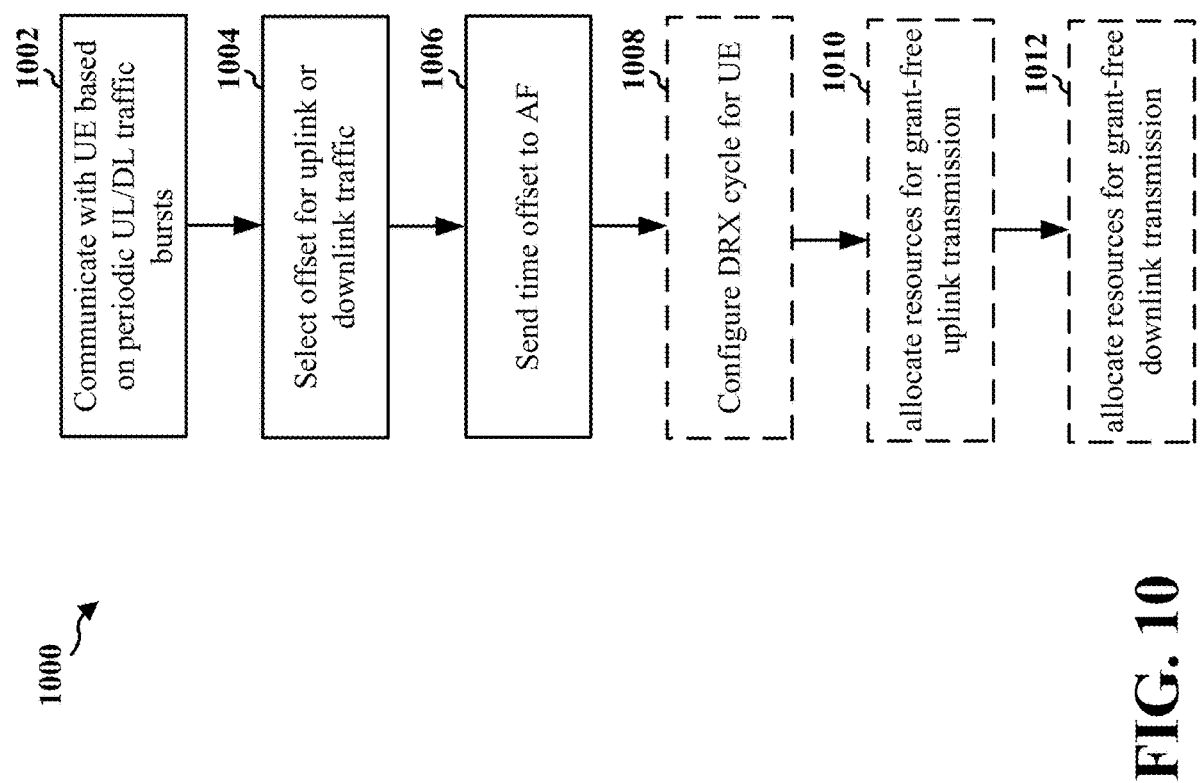
FIG. 10 is a flowchart of a method of wireless communication.

FIG. 10 is a flowchart 1000 of a method of wireless communication. The method may be performed by a base station or a component of a base station (e.g., the base station 102, 180, 310, 904; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to be synchronized with the application server, such that the base station may align uplink transmissions of a UE with its downlink reception periods, thereby reducing resource consumption as well as power consumption.

At 1002, the base station may communicate with a UE. For example, 1002 may be performed by reception component 1130 of apparatus 1102. The base station may communicate with the UE using periodic uplink traffic bursts and periodic downlink traffic bursts. The communication may comprise XR traffic, as described in connection with FIGS. 4-9.

At 1004, the base station may select a time offset to at least one of uplink traffic or downlink traffic. For example, 1004 may be performed by offset component 1140 of apparatus 1102. The base station may select the time offset to at least one of the uplink traffic of the downlink traffic to increase an overlap between the uplink traffic bursts and the downlink traffic bursts.

At 1006, the base station may send the time offset to an application function (AF). For example, 1006 may be performed by offset component 1140 of apparatus 1102. The base station may send the time offset to the application function via transmission component 1106.

In some aspects, for example at 1008, the UE may configure a DRX cycle for the UE. For example, 1008 may be performed by DRX configuration component 1142 of apparatus 1102. The UE may configure the DRX cycle for the UE based on a periodicity of traffic arrival for the periodic uplink traffic bursts and the periodic downlink traffic bursts.

In some aspects, for example at 1010, the base station may allocate resources for grant-free uplink transmission. For example, 1010 may be performed by allocation component 1144 of apparatus 1102. The time offset may be selected to increase an alignment between the resources allocated for the grant-free uplink transmission and downlink traffic arrival.

In some aspects, the time offset may be selected to offset the downlink traffic from the base station to increase an alignment between the resources allocated for the grant-free uplink transmission from a UE and downlink traffic arrival for the UE. When the base station configures the DRX cycle the base station may configure the DRX cycle for the UE based on a periodicity of the resources allocated for the grant-free uplink transmission and downlink traffic arrival In some aspects, the start times for the uplink traffic and the downlink traffic may be periodic. The time offset to the downlink traffic and the grant-free downlink resource allocation may be determined in a manner to increase alignment between uplink transmission resources and downlink transmission resources. The base station may configure the DRX cycle for the UE based on a periodicity of uplink transmission resources and downlink transmission resources.

In some aspects, the time offset determined for the uplink traffic may be determined to increase alignment between downlink transmission resources and uplink traffic arrival, e.g., when start times for the uplink traffic and the downlink traffic are periodic. The base station may configure the DRX cycle for the UE based on a periodicity of uplink transmission resources and downlink transmission resources.

In some aspects, for example at 1012, when start times for the uplink traffic and the downlink traffic are periodic, the base station may allocate resources for grant-free downlink transmission. For example, 1012 may be performed by allocation component 1144 of apparatus 1102. The base station may allocate resources for grant-free downlink transmission for uplink traffic and downlink traffic that are periodic. The time offset may be determined for the uplink traffic and the grant-free uplink resource allocation to increase alignment between uplink traffic arrival and downlink transmission resources. The base station may configure the DRX cycle for the UE based on a periodicity of uplink transmission resources and downlink transmission resources.

In some aspects, the base station may configure a DRX cycle for the UE based on a periodicity of uplink traffic arrival and downlink transmission resources. In some aspects, when the start times for the uplink traffic and downlink traffic are periodic, the base station may allocate resources for grant-free downlink transmission. The base station may determine the time offset to the uplink traffic and the grant-free uplink resource allocation to increase alignment between uplink transmission resources and downlink transmission resources. In some aspects, the base station may configure a DRX cycle for the UC based on a periodicity of uplink transmission resources and downlink transmission resources.

Figure 11:
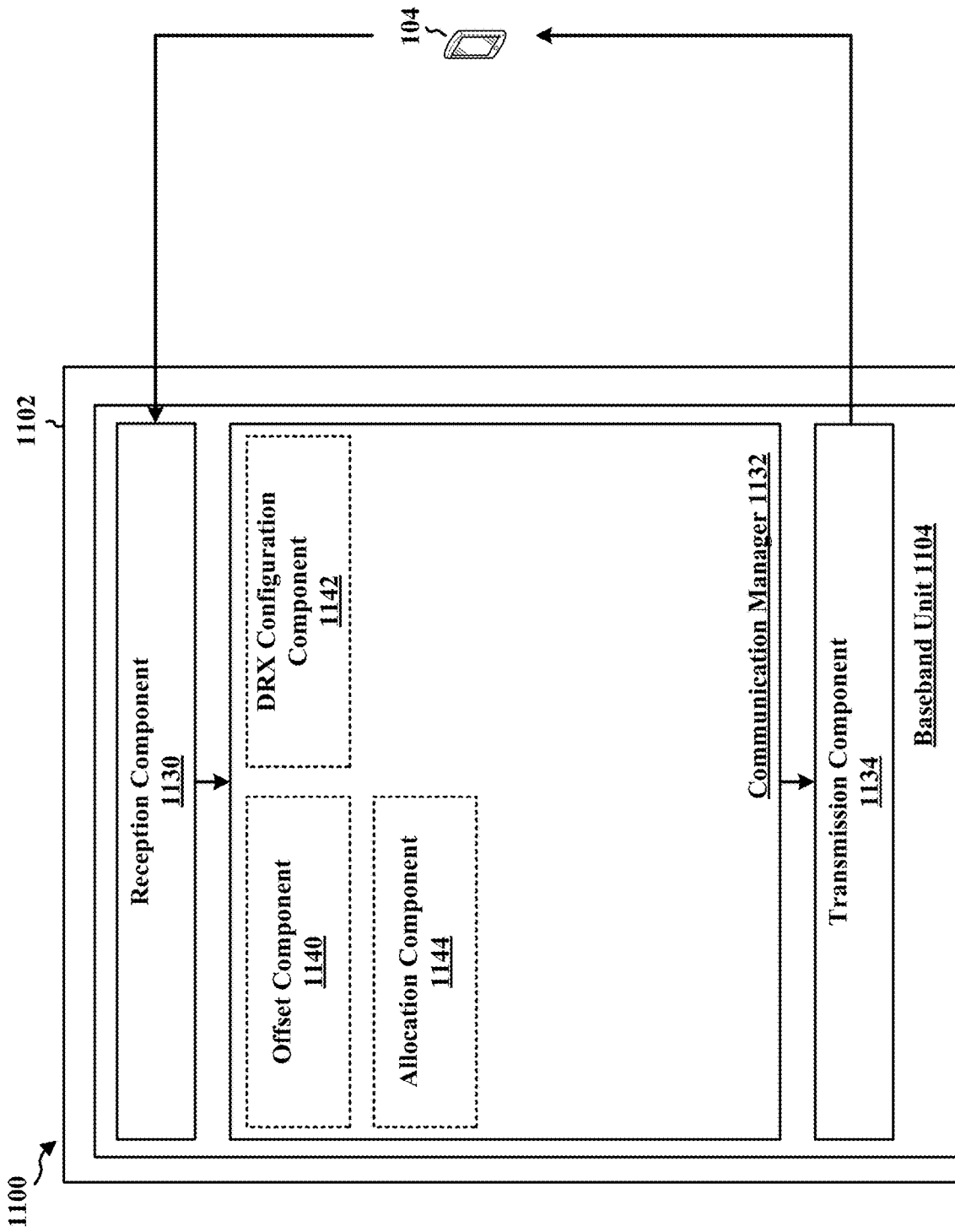
FIG. 11 is a diagram illustrating an example of a hardware implementation for an apparatus employing a processing system.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes an offset component 1140 that may select a time offset to at least one of uplink traffic or downlink traffic, e.g., as described in connection with 1004 of FIG. 10. The offset component 1140 may send the time offset to an AF, e.g., as described in connection with 1006 of FIG. 10. The communication manager 1132 further includes a DRX configuration component 1142 that may configure a DRX cycle for the UE e.g., as described in connection with 1008 of FIG. 10. The communication manager 1132 further includes an allocation component 1144 that may allocate resources for grant-free uplink transmission, e.g., as described in connection with 1010 of FIG. 10. The allocation component 1144 may allocate resources for grant-free downlink transmission, e.g., as described in connection with 1012 of FIG. 10. The reception component 1130 of apparatus 1102 may communicate with the UE, e.g., as described in connection with 1002 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for communicating with a UE using periodic uplink traffic bursts and periodic downlink traffic bursts. The apparatus includes means for selecting a time offset to at least one of uplink traffic or downlink traffic to increase an overlap between the uplink traffic bursts and the downlink traffic bursts. The apparatus includes means for sending the time offset to an AF. The apparatus further includes means for configuring a DRX cycle for the UE based on a periodicity of traffic arrival for the periodic uplink traffic bursts and the periodic downlink traffic bursts. The apparatus further includes means for allocating resources for grant-free uplink transmission, wherein the time offset is selected to increase an alignment between the resources allocated for the grant-free uplink transmission and downlink traffic arrival. The apparatus further includes means for configuring a DRX cycle for the UE based on a periodicity of the resources allocated for the grant-free uplink transmission and downlink traffic arrival. The apparatus further includes means for allocating resources for grant-free uplink transmission. The apparatus further includes means for determining the time offset to the downlink traffic and the grant-free downlink resource allocation to increase alignment between uplink transmission resources and downlink transmission resources. The apparatus further includes means for configuring a DRX cycle for the UE based on a periodicity of uplink transmission resources and downlink transmission resources. The apparatus further includes means for allocating resources for grant-free downlink transmission. The apparatus further includes means for determining the time offset for the uplink traffic to increase alignment between downlink transmission resources and uplink traffic arrival. The apparatus further includes means for configuring a DRX cycle for the UE based on a periodicity of uplink traffic arrival and downlink transmission resources. The apparatus further includes means for allocating resources for grant-free downlink transmission. The apparatus further includes means for determining the time offset to the uplink traffic and the grant-free uplink resource allocation to increase alignment between uplink transmission resources and downlink transmission resources. The apparatus further includes means for configuring a DRX cycle for the UE based on a periodicity of uplink transmission resources and downlink transmission resources. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIGS. 12-16 are flowcharts 1200, 1300, 1400, 1500, 1600 of methods of wireless communication. The methods may be performed by a UE or a component of a UE (e.g., the UE 104, 350, 902; the apparatus 1702; the cellular baseband processor 1704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The methods may allow a UE to reduce power consumption by aligning uplink transmissions to downlink receptions, which may allow the UE to extend its idle time and save power.

At 1202, the UE communicates with a base station. For example, 1202 may be performed by reception component 1730 and/or transmission component 1734 of apparatus 1702. The UE may communicate with the base station using periodic uplink traffic bursts and periodic downlink traffic bursts. The communication may comprise XR traffic, e.g., as described in connection with any of FIGS. 4-9.

At 1204, the UE may receive a configuration for a DRX cycle based on the periodic uplink and downlink traffic bursts. For example, 1204 may be performed by DRX component 1740 of apparatus 1702. Uplink transmissions from the UE may be grant based. Example aspects of configuring a DRX cycle are described in connection with 910 in FIG. 9. For example, DRX component 1740 of apparatus 1702 may receive the DRX configuration.

At 1206, the UE may delay sending an SR for uplink traffic to a beginning of a next DRX cycle. For example, 1206 may be performed by SR component 1742 of apparatus 1702. The SR may be sent or delayed by SR component 1742 of apparatus 1702.

At 1302, the UE communicates with a base station using periodic uplink traffic bursts and periodic downlink traffic bursts. For example, 1302 may be performed by reception component 1730 or transmission component 1734 of apparatus 1702. The communication may comprise XR traffic, e.g., as described in connection with any of FIGS. 4-9.

At 1304, the UE may receive a configuration for a DRX cycle based on the periodic uplink and downlink traffic bursts. For example, 1304 may be performed by DRX component 1740 of apparatus 1702. The UE's uplink transmissions may be grant based. Example aspects of configuring a DRX cycle are described in connection with 910 in FIG. 9.

At 1306, the UE may transmit an SR prior to an arrival of the uplink traffic when the arrival of uplink traffic burst is expected to arrive within the next DRX cycle. For example, 1306 may be performed by SR component 1742 of apparatus 1702. The SR may be sent based on a prediction or estimation that uplink traffic will arrive, e.g., based on a previous pattern of uplink traffic bursts.

At 1402, the UE communicates with a base station using periodic uplink traffic bursts and periodic downlink traffic bursts. For example, 1302 may be performed by reception component 1730 or transmission component 1734 of apparatus 1702. The communication may comprise XR traffic, e.g., as described in connection with any of FIGS. 4-9. A periodicity of uplink traffic arrivals might not be conveyed to the UE.

At 1404, the UE determines the periodicity of the uplink traffic. For example, 1304 may be performed by determination component 1744 of apparatus 1702. The UE may determine the periodicity based on a previous pattern of arrival of uplink traffic for transmission to the base station.

At 1406, the UE may send an SR for the uplink traffic at a beginning of a next DRX cycle prior to an uplink traffic burst arrival when the uplink traffic burst arrival is expected to arrive within the next DRX cycle. For example, 1406 may be performed by SR component 1742 of apparatus 1702. The SR may be sent based on a prediction or estimation that uplink traffic will arrive, e.g., based on a previous pattern of uplink traffic bursts.

At 1502, the UE communicates with a base station using periodic uplink traffic bursts and periodic downlink traffic bursts. For example, 1502 may be performed by reception component 1730 or transmission component 1734 of apparatus 1702. The communication may comprise XR traffic, e.g., as described in connection with any of FIGS. 4-9. A periodicity of uplink traffic arrivals might not be conveyed to the UE.

At 1504, the UE determines the periodicity of the uplink traffic. For example, 1504 may be performed by determination component 1744 of apparatus 1702. The UE may determine the periodicity based on a previous pattern of arrival of uplink traffic for transmission to the base station.

At 1506, the UE may delay sending an SR for uplink traffic to a beginning of a next DRX cycle. For example 1506 may be performed by SR component 1742 of apparatus 1702.

At 1602, the UE may communicate with a base station using periodic uplink traffic bursts and periodic downlink traffic bursts. For example, 1602 may be performed by reception component 1730 or transmission component 1734 of apparatus 1702. The communication may comprise XR traffic, e.g., as described in connection with any of FIGS. 4-9. A periodicity of uplink traffic arrivals might not be conveyed to the UE.

At 1604, the UE may select a time offset to at least one of uplink traffic or downlink traffic. For example, 1604 may be performed by offset component 1746 of apparatus 1702. The UE may select the time offset to at least one of uplink traffic or downlink traffic to increase overlap between the uplink traffic bursts and the downlink traffic bursts.

At 1606, the UE may send the time offset to an application client. For example, 1606 may be performed by transmission component 1734 of apparatus 1702.

Figure 17:
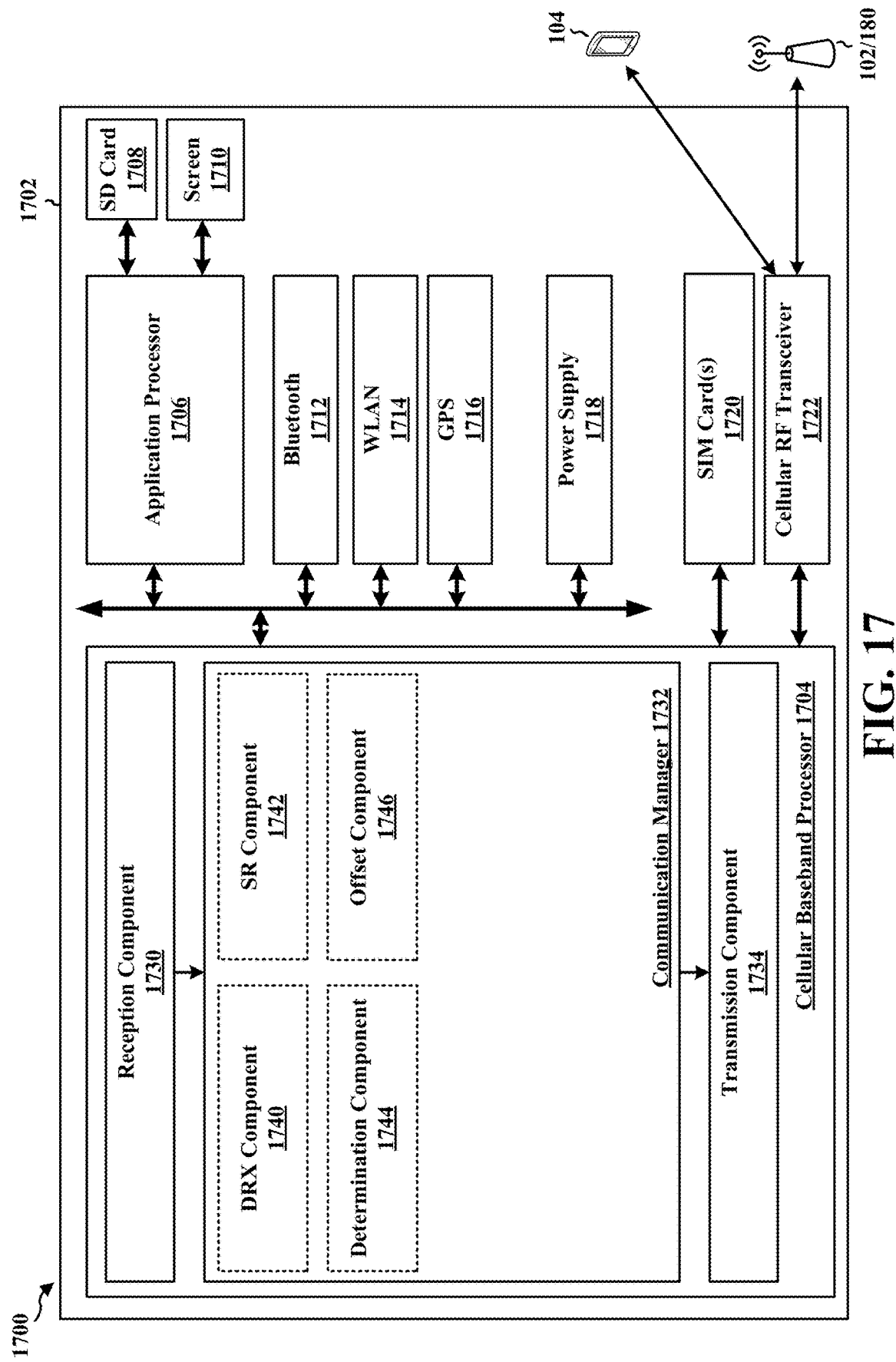
FIG. 17 is a diagram illustrating an example of a hardware implementation for an apparatus employing a processing system.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/ processor 359. In one configuration, the apparatus 1702 may be a modem chip and include just the baseband processor 1704, and in another configuration, the apparatus 1702 may be the entire UE (e.g., see 350 of FIG. 3) and include the aforediscussed additional modules of the apparatus 1702.

Figure 12:
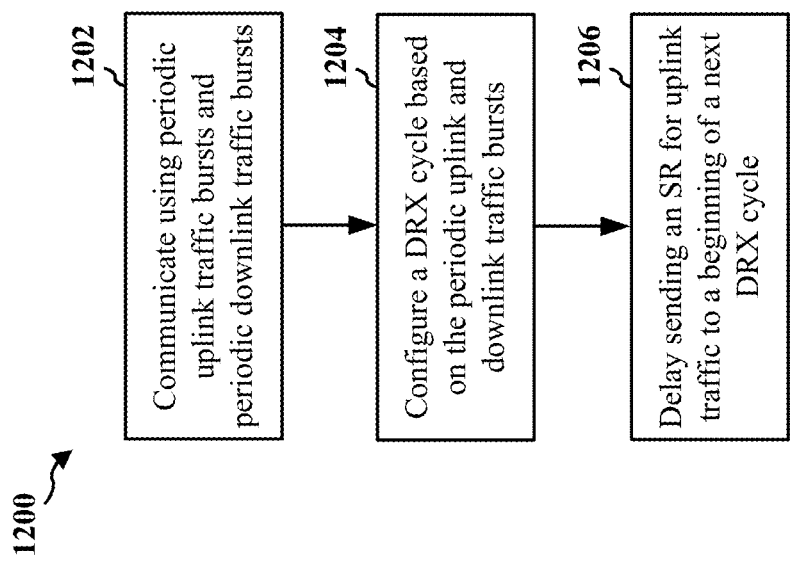
FIG. 12 is a flowchart of a method of wireless communication.
Figure 13:
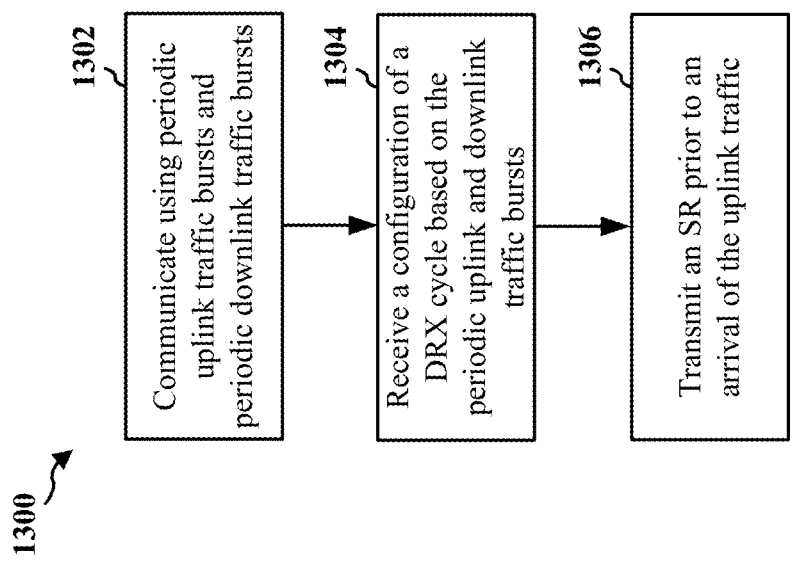
FIG. 13 is a flowchart of a method of wireless communication.
Figure 14:
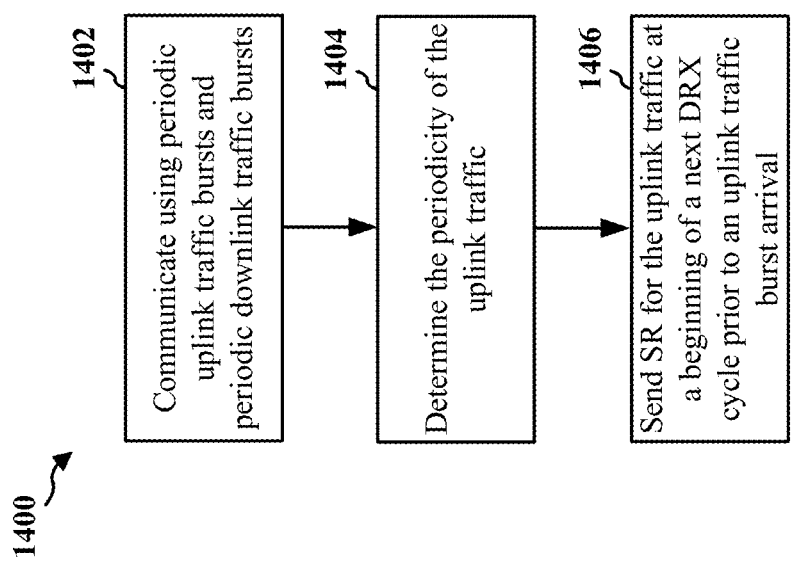
FIG. 14 is a flowchart of a method of wireless communication.
Figure 15:
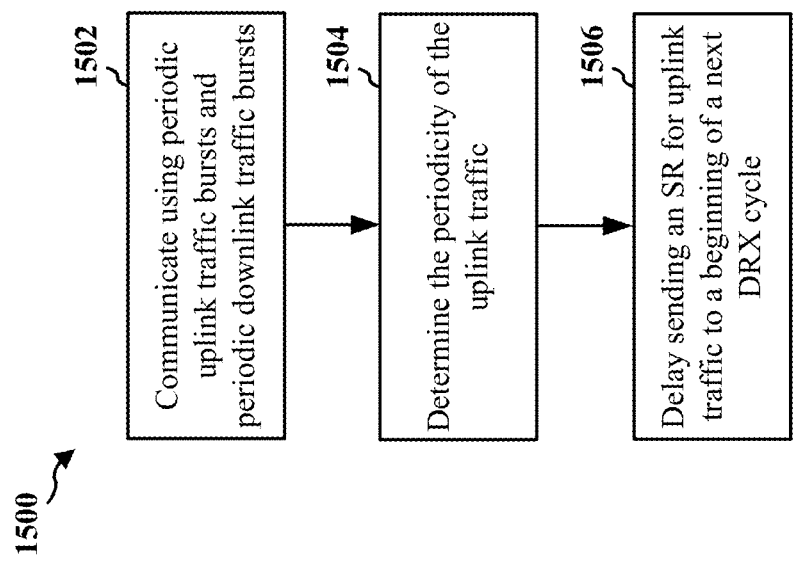
FIG. 15 is a flowchart of a method of wireless communication.
Figure 16:
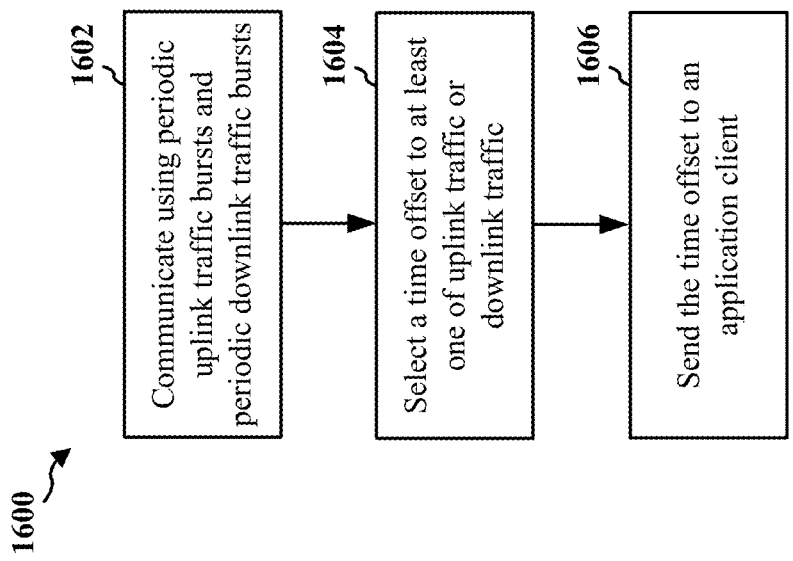
FIG. 16 is a flowchart of a method of wireless communication.

The communication manager 1732 includes a DRX component 1740 that is configured to configure a DRX cycle based on the periodic uplink and downlink traffic bursts, e.g., as described in connection with 1204 of FIG. 12. The DRX component 1740 is configured to receive a configuration for a DRX cycle based on the periodic uplink and downlink traffic bursts, e.g., as described in connection with 1304 of FIG. 13. The communication manager 1732 further includes an SR component 1742 that is configured to delay sending an SR for uplink traffic to a beginning of a next DRX cycle, e.g., as described in connection with 1206 of FIG. 12. The SR component 1742 may transmit an SR prior to an arrival of the uplink traffic when the arrival of uplink traffic burst is expected to arrive within the next DRX cycle, e.g., as described in connection with 1306 of FIG. 13. The SR component 1742 may send an SR for the uplink traffic at a beginning of a next DRX cycle prior to an uplink traffic burst arrival when the uplink traffic burst arrival is expected to arrive within the next DRX cycle, e.g., as described in connection with 1406 of FIG. 14. The SR component 1742 may delay sending an SR for uplink traffic to a beginning of a next DRX cycle, e.g., as described in connection with 1506 of FIG. 15. The communication manager 1732 further includes a determination component 1744 that is configured to determine the periodicity of the uplink traffic, e.g., as described in connection with 1404 of FIG. 14. The determination component 1744 determines the periodicity of the uplink traffic, e.g., as described in connection with 1504 of FIG. 15. The communication manager 1732 further includes an offset component 1746 that is configured to select a time offset to at least one of uplink traffic or downlink traffic, e.g., as described in connection with 1604 of FIG. 16. The reception component 1730 or transmission component 1734 may be configured to communicate with a base station, e.g., as described in connection with 1202 of FIG. 12, 1302 of FIG. 13, 1402 of FIG. 14, 1502 of FIG. 15, or 1602 of FIG. 16. The transmission component 1734 may be configured to send a time offset to an application client, e.g., as described in 1606 of FIG. 16.

The apparatus may include additional components that perform each of the blocks of the algorithm in the aforementioned flowcharts of FIGS. 12-15. As such, each block in the aforementioned flowcharts of FIGS. 12-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for communicating with a base station using periodic uplink traffic bursts and periodic downlink traffic bursts. The apparatus includes means for configuring a DRX cycle based on the periodic uplink and downlink traffic bursts, wherein uplink transmission are grant based. The apparatus includes means for delaying sending a scheduling request (SR) for uplink traffic to a beginning of a next DRX cycle. The apparatus includes means for receiving a configuration of a DRX cycle based on the periodic uplink and downlink traffic bursts, wherein uplink transmission are grant based. The apparatus includes means for transmitting an SR prior to an arrival of the uplink traffic when the arrival of uplink traffic burst is expected to arrive within the next DRX cycle. The apparatus includes means for communicating with a base station using periodic uplink traffic bursts and periodic downlink traffic bursts, wherein a periodicity of uplink traffic arrivals is not conveyed to the UE. The apparatus includes means for determining, by the UE, the periodicity of the uplink traffic. The apparatus includes means for sending a scheduling request (SR) for the uplink traffic at a beginning of a next DRX cycle prior to an uplink traffic burst arrival when the uplink traffic burst arrival is expected to arrive within the next DRX cycle. The apparatus includes means for delaying sending a scheduling request (SR) for the uplink traffic to a beginning of a next DRX cycle. The aforementioned means may be one or more of the aforementioned components of the apparatus 1702 configured to perform the functions recited by the aforementioned means. As described supra, the apparatus 1702 may include the TX Processor 368, the RX Processor 356, and the controller/ processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a base station comprising: communicating with a UE using periodic uplink traffic bursts and periodic downlink traffic bursts; selecting a time offset to at least one of uplink traffic or downlink traffic to increase an overlap between the uplink traffic bursts and the downlink traffic bursts; and sending the time offset to an AF.

In Example 2, the method of claim 1 further includes configuring a DRX cycle for the UE based on a periodicity of traffic arrival for the periodic uplink traffic bursts and the periodic downlink traffic bursts.

In Example 3, the method of claim 1 or 2 further includes allocating resources for grant-free uplink transmission, wherein the time offset is selected to increase an alignment between the resources allocated for the grant-free uplink transmission and downlink traffic arrival.

In Example 4, the method of any of claims 1-3 further includes configuring a DRX cycle for the UE based on a periodicity of the resources allocated for the grant-free uplink transmission and downlink traffic arrival.

In Example 5, the method of any of claims 1-4 further includes that the start times for the uplink traffic and the downlink traffic are periodic, the further including allocating resources for grant-free uplink transmission; and determining the time offset to the downlink traffic and the grant-free downlink resource allocation to increase alignment between uplink transmission resources and downlink transmission resources.

In Example 6, the method of any of claims 1-5 further includes configuring a DRX cycle for the UE based on a periodicity of uplink transmission resources and downlink transmission resources.

In Example 7, the method of any of claims 1-6 further includes that the start times for the uplink traffic and the downlink traffic are periodic, the method further including: allocating resources for grant-free downlink transmission; and determining the time offset for the uplink traffic to increase alignment between downlink transmission resources and uplink traffic arrival.

In Example 8, the method of any of claims 1-7 further includes configuring a DRX cycle for the UE based on a periodicity of uplink traffic arrival and downlink transmission resources.

In Example 9, the method of any of claims 1-8 further includes that the start times for the uplink traffic and downlink traffic are periodic, the method further including allocating resources for grant-free downlink transmission; and determining the time offset to the uplink traffic and the grant-free uplink resource allocation to increase alignment between uplink transmission resources and downlink transmission resources.

In Example 10, the method of any of claims 1-9 further includes configuring a DRX cycle for the UE based on a periodicity of uplink transmission resources and downlink transmission resources.

Example 11 is a device including one or more processors and one or more memories in electronic communication with the one or more processors storing instructions executable by the one or more processors to cause the system or apparatus to implement a method as in any of Examples 1-10.

Example 12 is a system or apparatus including means for implementing a method or realizing an apparatus as in any of Examples 1-10.

Example 13 is a non-transitory computer readable medium storing instructions executable by one or more processors to cause the one or more processors to implement a method as in any of Examples 1-10.

Example 14 is a method of wireless communication at a UE comprising communicating with a base station using periodic uplink traffic bursts and periodic downlink traffic bursts; receiving a configuration of a discontinuous reception (DRX) cycle based on the periodic uplink and downlink traffic bursts, wherein uplink transmission are grant based; and delaying sending a scheduling request (SR) for uplink traffic to a beginning of a next DRX cycle.

Example 15 is a device including one or more processors and one or more memories in electronic communication with the one or more processors storing instructions executable by the one or more processors to cause the system or apparatus to implement a method as in Example 14.

Example 16 is a system or apparatus including means for implementing a method or realizing an apparatus as in Example 14.

Example 17 is a non-transitory computer readable medium storing instructions executable by one or more processors to cause the one or more processors to implement a method as in Example 14.

Example 18 is a method of wireless communication at a UE comprising communicating with a base station using periodic uplink traffic bursts and periodic downlink traffic bursts; selecting a time offset to at least one of uplink traffic or downlink traffic to increase overlap between the uplink traffic bursts and the downlink traffic bursts; and sending the time offset to an application client.

Example 19 is a device including one or more processors and one or more memories in electronic communication with the one or more processors storing instructions executable by the one or more processors to cause the system or apparatus to implement a method as in Example 18.

Example 20 is a system or apparatus including means for implementing a method or realizing an apparatus as in Example 18.

Example 21 is a non-transitory computer readable medium storing instructions executable by one or more processors to cause the one or more processors to implement a method as in Example 18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network entity comprising:
   communicating, at the network entity, using periodic uplink traffic bursts and periodic downlink traffic bursts;

selecting, at the network entity, a time offset for at least one of uplink traffic or downlink traffic, wherein the time offset adjusts an alignment in a time domain between the periodic uplink traffic bursts and the periodic downlink traffic bursts, wherein the periodic uplink traffic bursts and the periodic downlink traffic bursts are within a first discontinuous reception (DRX) cycle for a user equipment (UE);

sending, from the network entity, the time offset to an application function (AF) of an edge server, the network entity communicating data from the edge server to the UE within the first DRX cycle for the UE; and configuring a DRX cycle for the UE based at least on a first periodicity of uplink transmission resources and downlink transmission resources, a second periodicity of uplink traffic arrival and the downlink transmission resources, or a third periodicity of resources allocated for a grant-free uplink transmission and a downlink traffic arrival.

2. The method of claim 1, further comprising:
configuring the DRX cycle for the UE based on a fourth periodicity of the uplink traffic arrival to adjust the alignment in the time domain between the periodic uplink traffic bursts and the periodic downlink traffic bursts.

3. The method of claim 1, wherein start times for the uplink traffic and the downlink traffic are periodic, the method further comprising:
allocating the uplink transmission resources for the grant-free uplink transmission; and
determining the time offset between the grant-free uplink transmission and a downlink resource allocation to adjust the alignment between the uplink transmission resources and the downlink transmission resources.

4. The method of claim 3, further comprising:
configuring the DRX cycle for the UE based on the first periodicity of the uplink transmission resources and the downlink transmission resources.

5. The method of claim 1, wherein start times for the uplink traffic and the downlink traffic are periodic, the method further comprising:
allocating the downlink transmission resources for grant-free downlink transmission; and
determining the time offset for the uplink traffic to adjust the alignment between the downlink transmission resources and the uplink traffic arrival.

6. The method of claim 5, further comprising:
configuring the DRX cycle for the UE based on the second periodicity of the uplink traffic arrival and the downlink transmission resources.

7. The method of claim 1, wherein start times for the uplink traffic and the downlink traffic are periodic, the method further comprising:
allocating the downlink transmission resources for grant-free downlink transmission; and
determining the time offset to the uplink traffic and grant-free uplink resource allocation to adjust the alignment between the uplink transmission resources and the downlink transmission resources.

8. The method of claim 7, further comprising:
configuring the DRX cycle for the UE based on the first periodicity of the uplink transmission resources and the downlink transmission resources.

9. The method of claim 1, further comprising:
allocating the uplink transmission resources for the grant-free uplink transmission associated with the periodic uplink traffic bursts, wherein the time offset is selected to adjust the alignment within a same DRX cycle between the resources allocated for the grant-free uplink transmission and the downlink traffic arrival.

10. The method of claim 9, further comprising:
configuring the DRX cycle for the UE based on the third periodicity of the resources allocated for the grant-free uplink transmission and the downlink traffic arrival.

11. An apparatus for wireless communication at a network entity comprising:
memory; and
at least one processor coupled to the memory and configured to cause the apparatus to:
communicate, at the apparatus, using periodic uplink traffic bursts and periodic downlink traffic bursts;
select, at the apparatus, a time offset for at least one of uplink traffic or downlink traffic, wherein the time offset adjusts an alignment in a time domain between the periodic uplink traffic bursts and the periodic downlink traffic bursts, wherein the periodic uplink traffic bursts and the periodic downlink traffic bursts are within a first discontinuous reception (DRX) cycle for a user equipment (UE);
send, from the apparatus, the time offset to an application function (AF) of an edge server, the apparatus communicating data from the edge server to the UE within the first DRX cycle for the UE; and
configure a DRX cycle for the UE based at least on a first periodicity of uplink transmission resources and downlink transmission resources, a second periodicity of uplink traffic arrival and the downlink transmission resources, or a third periodicity of resources allocated for a grant-free uplink transmission and a downlink traffic arrival.

12. The apparatus of claim 11, wherein the at least one processor is configured to:
configure the DRX cycle for the UE based on a fourth periodicity of the uplink traffic arrival to adjust the alignment in the time domain between the periodic uplink traffic bursts and the periodic downlink traffic bursts.

13. The apparatus of claim 11, wherein the at least one processor is configured to:
allocate the uplink transmission resources for the grant-free uplink transmission; and
determine the time offset between the grant-free uplink transmission and a downlink resource allocation to adjust the alignment between the uplink transmission resources and the downlink transmission resources.

14. The apparatus of claim 13, wherein the at least one processor is configured to:
configure the DRX cycle for the UE based on the first periodicity of the uplink transmission resources and the downlink transmission resources.

15. The apparatus of claim 11, wherein the at least one processor is configured to:
allocate the downlink transmission resources for grant-free downlink transmission; and
determining the time offset for the uplink traffic to adjust the alignment between the downlink transmission resources and the uplink traffic arrival.

16. The apparatus of claim 15, wherein the at least one processor is configured to:
configure the DRX cycle for the UE based on the second periodicity of the uplink traffic arrival and the downlink transmission resources.

17. The apparatus of claim 11, wherein the at least one processor is configured to:

allocate the downlink transmission resources for grant-free downlink transmission; and determine the time offset to the uplink traffic and grant-free uplink resource allocation to adjust the alignment between the uplink transmission resources and the downlink transmission resources.

18. The apparatus of claim 17, wherein the at least one processor is configured to:

configure the DRX cycle for the UE based on the first periodicity of the uplink transmission resources and the downlink transmission resources.

19. The apparatus of claim 11, wherein the at least one processor is configured to:

allocate the uplink transmission resources for the grant-free uplink transmission associated with the periodic uplink traffic bursts, wherein the time offset is selected to adjust the alignment between the resources allocated for the grant-free uplink transmission and the downlink traffic arrival.

20. The apparatus of claim 19, wherein the at least one processor is configured to:

configure the DRX cycle for the UE based on the third periodicity of the resources allocated for the grant-free uplink transmission and the downlink traffic arrival.

21. An apparatus for wireless communication at a user equipment (UE), comprising:

memory; and at least one processor coupled to the memory and configured to cause the apparatus to:

communicate, at the apparatus, with a network entity using periodic uplink traffic bursts and periodic downlink traffic bursts;

select, at the apparatus, a time offset for at least one of uplink traffic or downlink traffic, wherein the time offset adjusts an alignment in a time domain between the periodic uplink traffic bursts and the periodic downlink traffic bursts;

send, from the apparatus, the time offset to an application client of an edge server; and receive a configuration for a discontinuous reception (DRX) cycle based at least on a first periodicity of uplink transmission resources and downlink transmission resources, a second periodicity of uplink traffic arrival and the downlink transmission resources, or a third periodicity of resources allocated for a grant-free uplink transmission and a downlink traffic arrival.

22. The apparatus of claim 21, wherein the at least one processor is configured to:

receiving an allocation of the uplink transmission resources for the grant-free uplink transmission associated with the periodic uplink traffic bursts, wherein the time offset adjusts the alignment between the allocation of the uplink transmission resources for the grant-free uplink transmission and the downlink traffic arrival.

23. The apparatus of claim 21, wherein the at least one processor is configured to:

receive an allocation of the uplink transmission resources for grant-free uplink transmissions, wherein start times for the uplink traffic and the downlink traffic are periodic, wherein the time offset between the grant-free uplink transmissions and a downlink resource allocation adjust the alignment between the uplink transmission resources and the downlink transmission resources.

24. The apparatus of claim 21, wherein the at least one processor is configured to:

receive an allocation of downlink resources for grant-free downlink transmission, wherein start times for the uplink traffic and the downlink traffic are periodic, wherein the time offset for the uplink traffic adjusts the alignment between the downlink resources and the uplink traffic arrival.

25. The apparatus of claim 21, wherein the at least one processor is configured to:

receive an allocation of downlink resources for grant-free downlink transmission, wherein start times for the uplink traffic and the downlink traffic are periodic, wherein the time offset for the uplink traffic and grant-free uplink resource allocation adjusts the alignment between the uplink transmission resources and the downlink resources.

* * * * *